US008731309B1

United States Patent
Deskevich

(10) Patent No.: US 8,731,309 B1
(45) Date of Patent: May 20, 2014

(54) METHOD AND SYSTEM FOR PROCESSING RASTER SCAN IMAGES

(71) Applicant: Exelis Inc., McLean, VA (US)

(72) Inventor: Michael Paul Deskevich, Boulder, CO (US)

(73) Assignee: Exelis Inc., McLean, VA (US)

( * ) Notice: Subject to any disclaimer, the term of this patent is extended or adjusted under 35 U.S.C. 154(b) by 0 days.

(21) Appl. No.: 13/844,393

(22) Filed: Mar. 15, 2013

(51) Int. Cl.
*G06K 9/62* (2006.01)

(52) U.S. Cl.
USPC .......... 382/224; 382/199; 382/181; 382/226; 382/227; 382/225

(58) Field of Classification Search
USPC ................. 382/181, 199, 224, 225, 226, 227; 707/722, 723, 724, 725, 729, 731
See application file for complete search history.

(56) References Cited

U.S. PATENT DOCUMENTS

| | | | | |
|---|---|---|---|---|
| 6,111,994 A | * | 8/2000 | Katayama et al. | 382/298 |
| 7,206,443 B1 | * | 4/2007 | Duvdevani et al. | 382/149 |
| 7,388,979 B2 | * | 6/2008 | Sakai et al. | 382/149 |
| 7,817,817 B2 | * | 10/2010 | Wu et al. | 382/100 |

* cited by examiner

*Primary Examiner* — Ali Bayat
(74) *Attorney, Agent, or Firm* — Davidson Berquist; Jackson & Gowdey, LLP

(57) ABSTRACT

A method of converting a raster scan image to a vector-based image including (a) reading a scanline of a raster scan image containing n pixels per scanline; (b) classifying n+1 groupings of four adjacent pixels within the scanline using only the four adjacent pixel values; (c) assigning to each grouping (x,y), for all groupings in the scanline, plural vectors based on (1) the classification of the grouping (x,y) and (2) vectors assigned to a grouping (x−1,y) and vectors assigned to a grouping (x, y−1); (d) adding a point (x,y) to at least one vector assigned to the grouping (x,y) when the classification of grouping (x,y) indicates that the point (x,y) corresponds to a corner; (e) determining whether the points added to any vector form a closed loop; (f) writing out the points added to any vector that form a closed loop; and (g) repeating steps (a)-(f) for all of the scanlines of the raster scan image.

14 Claims, 14 Drawing Sheets

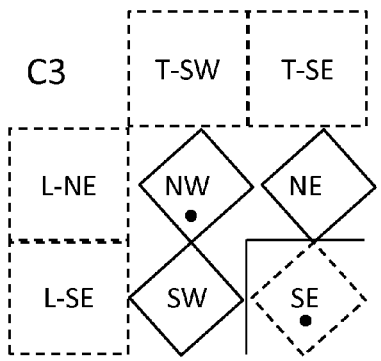
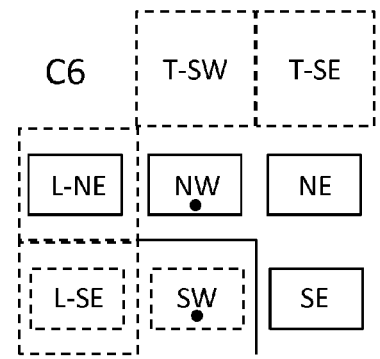
Fig. 3A                     Fig. 3B
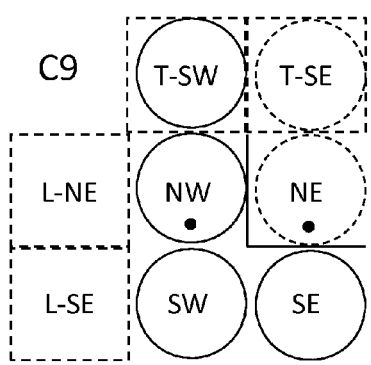
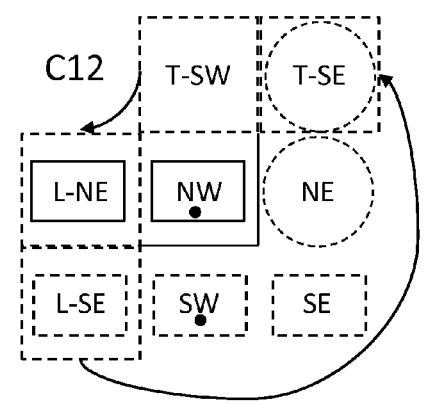
Fig. 3C                     Fig. 3D

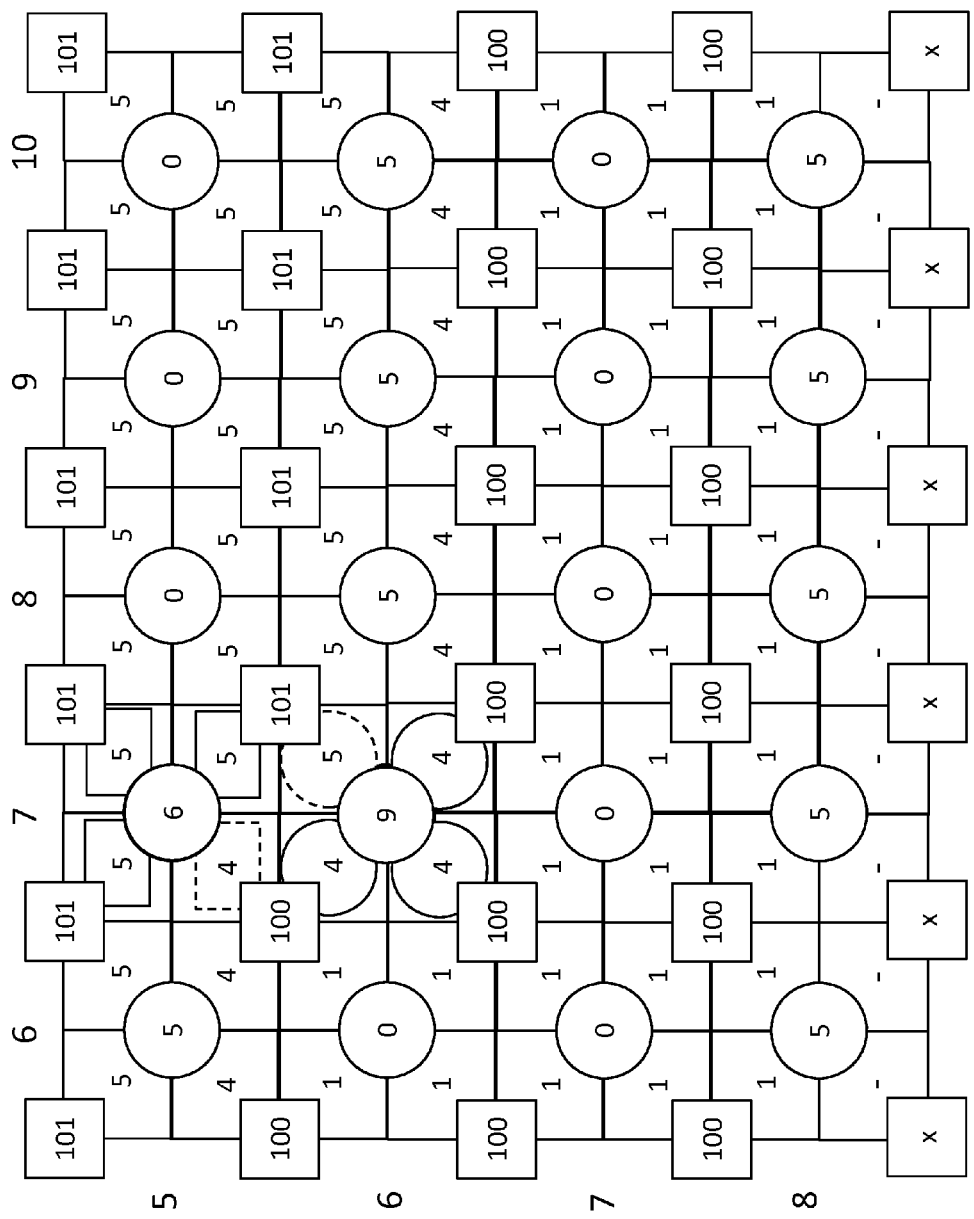

METHOD AND SYSTEM FOR PROCESSING RASTER SCAN IMAGES

FIELD OF INVENTION

The present invention is directed to a method and system for processing raster scan images, and, in one embodiment, to a method and system for parsing out vectors and/or polygons from raster scan images processed on a line-by-line basis.

DISCUSSION OF THE BACKGROUND

A raster-to-vector (r2v) algorithm is a method of converting pixelized raster data into vector data where the vectors are the edges which follow along where pixels change color. Known raster-to-vector algorithms utilize gradient following algorithms. A list of vectors is built up by tracing the edges along which the change in color (gradient) is a constant. In such methods, the raster is searched in a random-access fashion such that a single vector is being built until it is closed by wrapping back onto itself. Most known raster-to-vector algorithms differ by how they detect the color gradient and the iteration pattern they use to search the raster or to build the active vector. However, many such algorithms traverse the image and trace out where the color changes. There are some additional variations when the raster itself is too big to fit in memory. These methods will load a tile of raster data in memory, build all the vectors for that tile then load a different tile and repeat, finally stitching together all the tiles in the end.

Such raster-to-vector algorithms require some form of random-access to the data. The two options are to load the entire image into memory so that arbitrary pixels can be inspected for adjacent color changes, or to split the image up into tiles, load each tile, do a random-access raster-to-vector processing on each tile, then stitch the tiles back together. The former approach is often used for smaller images; however, when the image is too large to fit into memory the tile approach must be utilized. However, such processing techniques scale up badly as the image grows and the number and size of the extracted vectors grows. As such, known raster-to-vector algorithms require multiple, random access of the source image data which for large images becomes unwieldy if they cannot fit into memory.

BRIEF DESCRIPTION OF THE DRAWINGS

The following description, given with respect to the attached drawings, may be better understood with reference to the non-limiting examples of the drawings, wherein:

FIGS. 3A-3L are data flow diagrams indicating how vectors are processed for each of the twelve cases that arise when a new pixel is processed using left-to-right and top-to-bottom processing;

FIGS. 4A-4F combine to form a pixel/node/vector diagram showing the vectors created with respect to the exemplary image of FIG. 1A.

DISCUSSION OF THE PREFERRED EMBODIMENTS

Figure 1A:
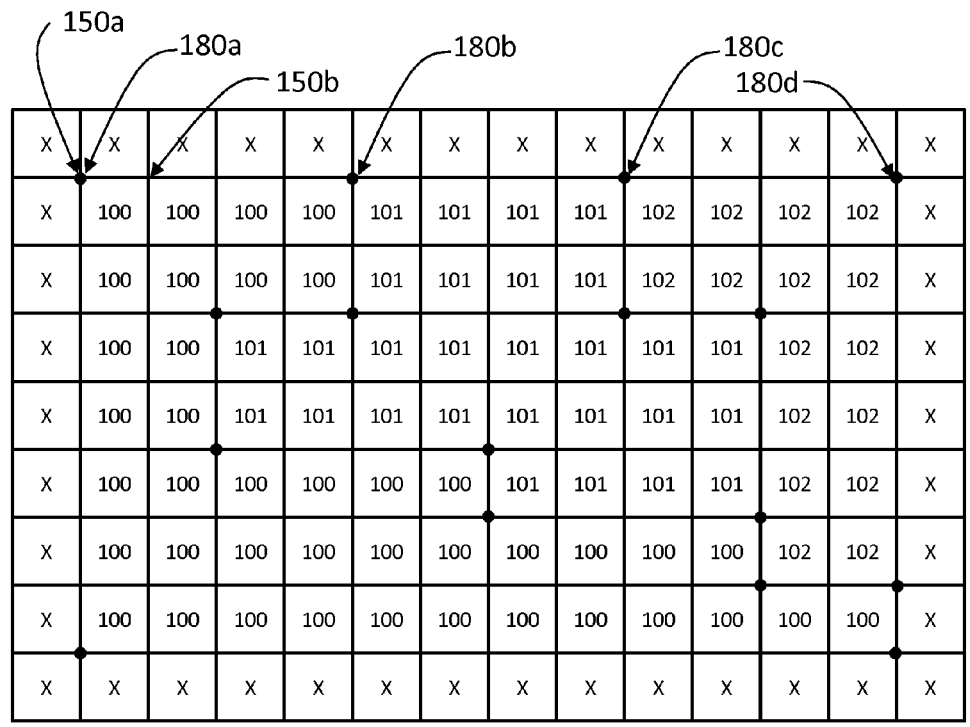
FIG. 1A is an exemplary, reduced-scale representation of the pixels of a raster scan image such as could be converted to a series of vectors representing the various pixel values.

Turning to FIG. 1A, an exemplary, reduced-scale representation of the pixels of a raster scan image such as could be converted to a series of vectors representing the various pixel values is illustrated. According to the example, a reduced-scale image consists of 12 pixels by 7 pixels that are read in one row at a time. The boxes labeled with an "X" represent markers showing that the row or portion of a row is an edge that does not represent an actual image pixel. While it possible to allocate extra space to store the edge values, the system need not actually allocate additional space for the pixels labeled with an "X" but may instead detect where edges are mathematically.

To address issues that arose with known raster-to-vector systems, the present system need only read in and process the image a line at a time with only two lines of the image being processed at a time. In general, the exemplary image is composed of only three different pixel values (100, 101 and 102). As will be described in greater detail below, a series of vectors are generated that encircle each of the different pixels that are contiguous that have the same pixel value. For example, groups of pixels having a value of 100 are grouped together, as are pixels having a value of 101 and pixels having a value of 102. In practice, there may be hundreds of sets of vectors representing each of the different groupings of the various pixel values depending on where the pixels values are within the image.

As describe above, the method need only keep two scanlines of data in memory at a time and only need scan once through the source image. This is significantly faster than known algorithms because there is no need to repeat access to a pixel which (in the large image case) would require re-reading data from the disk multiple times. This method is limited only by storing in memory two scanlines worth of raster data along with and any non-closed vector. In addition, while other known methods (attempt to) store the entire raster image and create one vector at a time, the present invention only stores a small portion of the raster and creates all the vectors simultaneously, thereby allowing closed vectors to be purged from memory. As a result, it is possible to achieve both a smaller memory footprint (by only storing what is active) and a faster implementation (only touching each pixel in the raster file once) than is available using known raster to vector methods.

The method as described herein analyzes vectors from the point of view of "nodes" which are assumed to be at the crosspoint between four adjacent pixels. (There are n+1 nodes processed for each of the n pixels of a scanline.) For an image of m lines, the system will have processed (n+1)*(m+1) nodes at the end of processing the whole image.

FIG. 1A shows exemplary, adjacent nodes 150a and 150b that represent the first two nodes of an image and lie between the top edge of the image and the first actual line of data. Nodes can be referenced using a Cartesian coordinate system (x,y) with node 150a acting as the node at position (1,1). All nodes within the same horizontal row will have a common "y" value, and all nodes within the same vertical column will have a common "x" value.

Figure 1B:
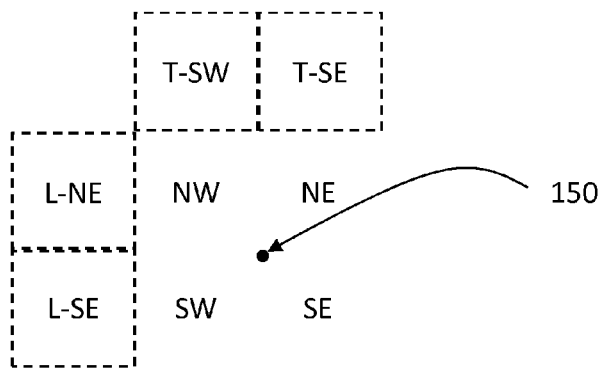
FIG. 1B is an enlarged section of an exemplary node that is at the intersection of a set of four adjacent pixels such as would occur within the image of FIG. 1A.

As shown in FIG. 1B, a node can further be classified by which, if any, of the pixel values around the node are equal to each other. There are at most four possible different values surrounding a node (when all the pixels are different) and as few as one value surrounding a node (when all the pixels are the same); however, based on adding left-to-right and top to bottom, there are only twelve possible cases to address. Those cases will be referenced with respect to the values of the pixels surrounding the node, and the pixels will be referenced by their relative position compare to their corresponding node: NW, NE, SW and SE.

Figure 2A:
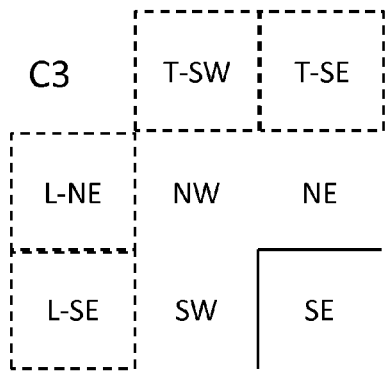
FIGS. 2A-2L are usage case diagrams indicating how nodes are classified in terms of their relationships to the pixels surrounding the nodes.
Figure 2B:
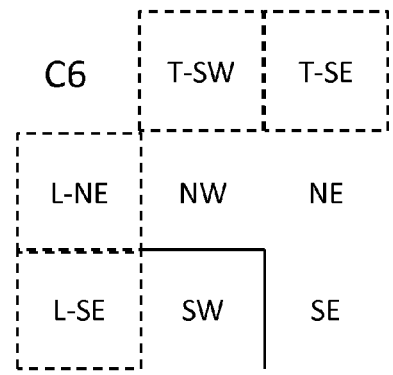
Figure 2C:
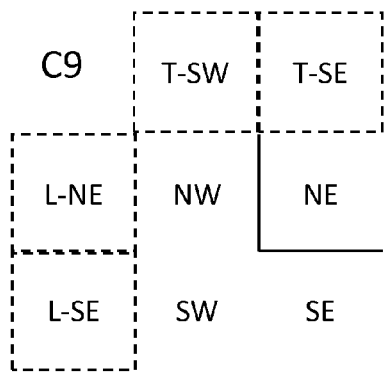
Figure 2D:
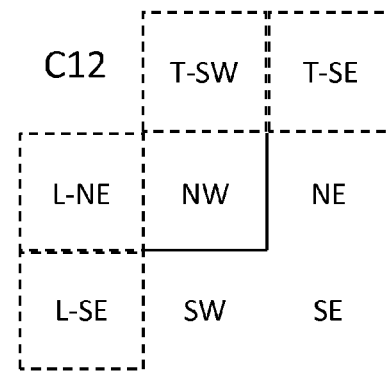
Figure 2E:
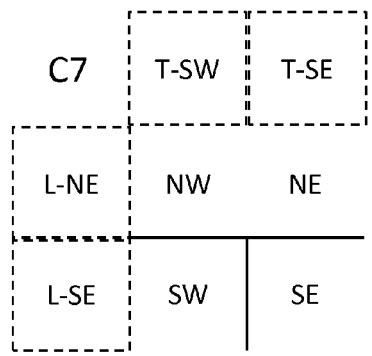
Figure 2F:
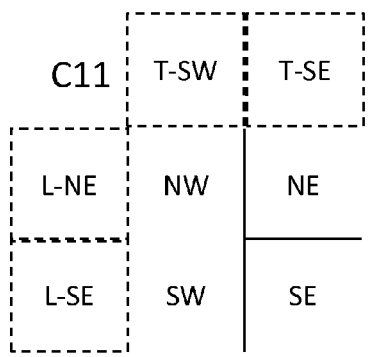
Figure 2G:
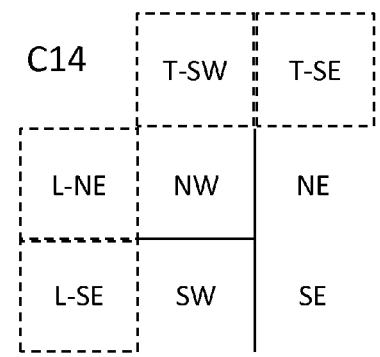
Figure 2H:
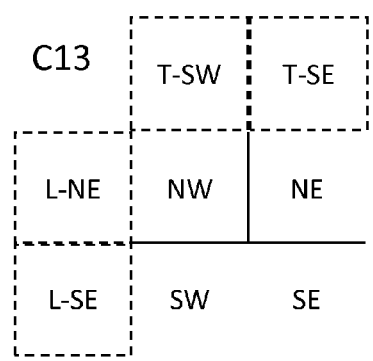
Figure 2I:
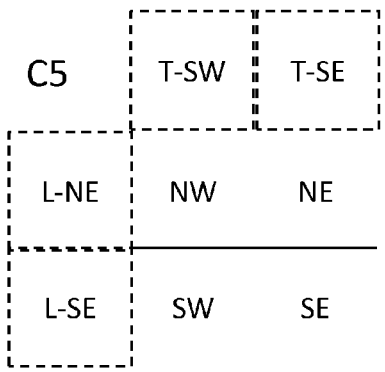
Figure 2J:
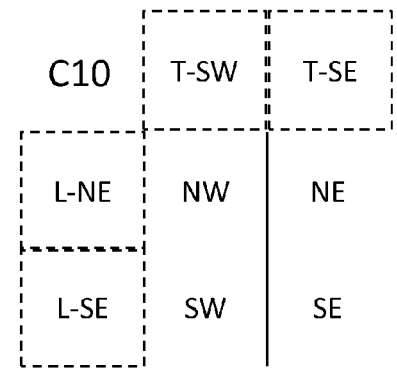
Figure 2K:
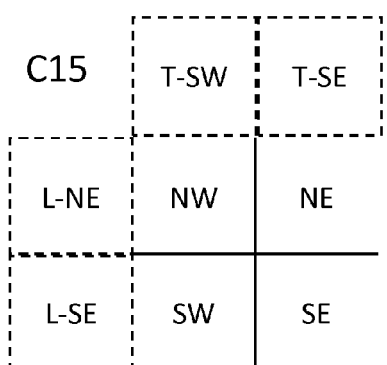
Figure 2L:
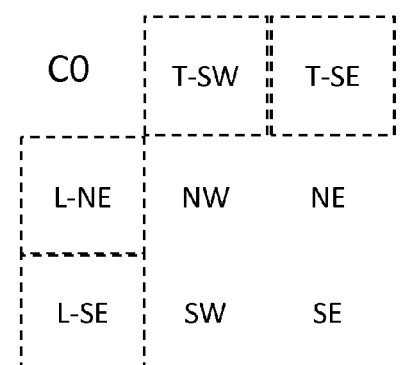

Each of those classifications is shown in FIGS. 2A-2L. As used in those figures, a line separating two pixels represents that the separated pixels have different values while non-separated pixels have the same value. For example, FIG. 2A represents an upper left-hand corner separating two polygons. The pixels at NW, NE and SW have the same values, while the pixel at SE has a different value from the other three. Such a configuration can also be thought of mathematically where (NW=NE=SW, but NW!=SE), where "!=" represents not equal. As shown in the upper left hand corner of FIG. 2A, this configuration of pixels is referenced as case 3 (or "C3"). Similarly, FIG. 2B shows an upper right hand corner where NW=NE=SE, but NW!=SW. FIGS. 2C and 2D represent the lower left and right hand corners, respectively. FIGS. 2E-2H represent four different "T" configurations between three different polygons, each. FIGS. 2I and 2J represent nodes between two polygons, divided horizontally and vertically, respectively. FIG. 2K shows a node between four dissimilar pixels, and FIG. 2L shows a node between four pixels having the same value. As summarized in Table 1 below, the twelve cases are:

TABLE 1

| Figure | Case | Values | Node Type |
|---|---|---|---|
| 2A | C3 | NW = NE = SW, but NW != SE | Corner |
| 2B | C6 | NW = NE = SE, but NW != SW | Corner |
| 2C | C9 | NW = SW = SE, but NW != NE | Corner |
| 2D | C12 | NE = SW = SE, but NW != NE | Corner |
| 2E | C7 | NW = NE, but NW != SW and NW != SE | T-Junction |
| 2F | C11 | NW = SW, but NW != NE and NW != SE | T-Junction |
| 2G | C14 | NE = SE, but NE != NW and NE != SW | T-Junction |
| 2H | C13 | SW = SE, but SW !=NW and SW != NE | T-Junction |
| 2I | C5 | NW = NE, and SW = SE, but NW != SW | Horiz. edge between polygons |
| 2J | C10 | NW = SW, and NE = SE, but NW != NE | Vertical edge between polygons |
| 2K | C15 | No values equal | All dissimilar |
| 2L | C0 | NW = NE = SW = SE | All the same |

As can be seen from the classification of each node by reference to only the four pixels surrounding it, the classification can be completed on a line-by-line basis and does not require that the whole image be stored in memory (or tiled). Once a node has been classified, its relationship to the node to its left (node (x−1, y)) and the top node above it (node (x, y−1)) can be used to determine whether the pixels surrounding the nodes are part of new vectors to be processed or may be part of already existing vectors created with reference to earlier nodes (i.e., nodes above or to the left of the node being processed).

To handle the vector processing, each node is configured such that it can track up to four separate vectors, one to "encircle" each of the pixels surrounding the node. One or more new vectors is created in memory every time an "upper left corner" node is found, as in cases 3, 7, 11, 15 (see FIGS. 2A, 2E, 2F and 2K, respectively). Each node will encode at least two vectors, one going counter clockwise (the outside skin) and one going clockwise (the inside skin). This is how holes inside of vectors are tracked. Since the (1,1) node (150a) corresponding to the upper left pixel in a raster is necessarily classified as 3, new vectors will be initialized immediately as the image begins to be read in.

Figure 3E:
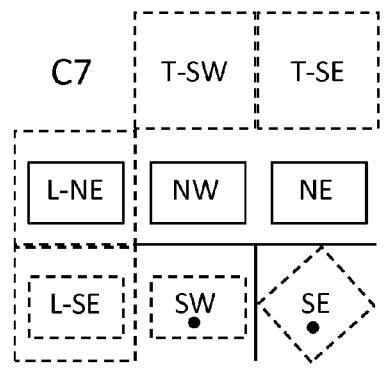
Figure 3F:
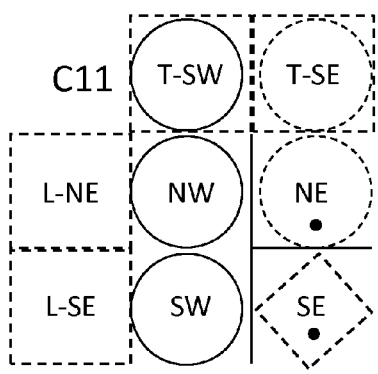
Figure 3G:
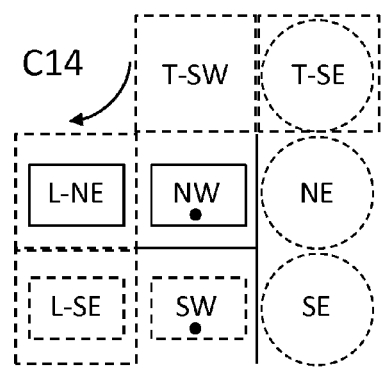
Figure 3H:
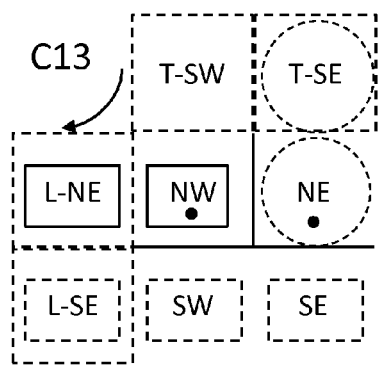
Figure 3I:
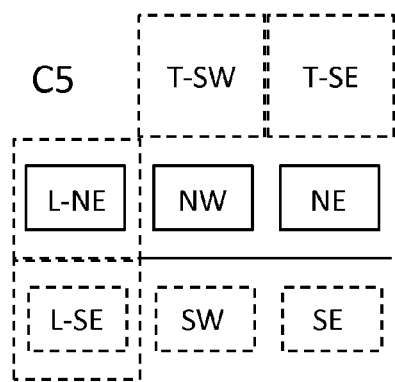
Figure 3J:
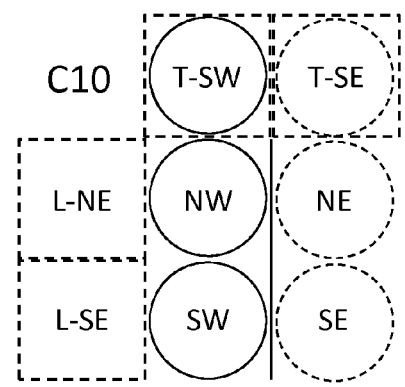
Figure 3K:
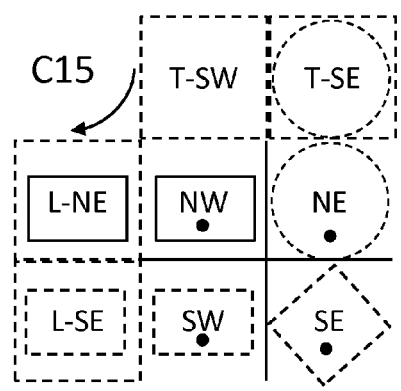
Figure 3L:
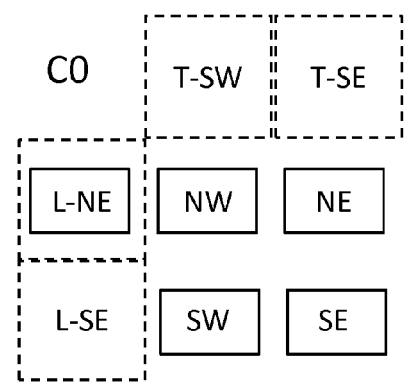

Existing vectors are extended by how adjacent like and dissimilar pixels are grouped (or added together), if possible. Since addition is a pairwise operation, there are 12×12 or 144 different possible ways to add nodes together. However, only 12 will occur when reading scanlines from top to bottom, left to right. The vectors corresponding to the pixels can cause a number of operations to occur (in addition to the creation of new vectors). Vectors can be extended by adding the coordinates of the node to the front or back of existing vectors, or one or more vectors can be closed (i.e., complete a polygon). FIGS. 3A-3L show how vectors are extended. As seen in FIG. 3A, the NW vector is newly generated in case 3, as is the SE vector. In general, a diamond indicates the creation of a new vector, and a solid diamond indicates that the new vector corresponds to the NW vector, as opposed to a dashed diamond which corresponds to the SE vector. The SW and NE vectors likewise have a solid diamond, so their values are assigned to the vector number as was assigned for the NW vector.

As shown in FIG. 3B, vectors can be extended from neighboring nodes. Vectors L-NE and L-SE are short-hand notations for the NE and SE vectors of the node to the left of the currently processed node. Similarly, vectors T-SW and T-SE correspond to the SW and SE vectors of the node to the top of the currently processed node. As shown in case 6 (FIG. 3B), the vector value for the L-NE node is enclosed by a solid rectangle. By including the same solid rectangle for the NW, NE, and SE entries, it is understood that the vector value from the L-NE vector is copied to the NW, NE and SE vector entries of the current node. The dashed rectangle around the SW vector indicates that the SW vector value is copied from the SE vector of the left-adjacent node (or the L-SE vector). In general, vectors having the same value are depicted with the same shape and line weight (i.e., dashed or solid). FIGS. 3C-3L show how the remaining vectors are copied or extended. The vector extension rules are summarized below in Table 2.

TABLE 2

| Figure | Case | A | B | C | D |
|---|---|---|---|---|---|
| 3A | C3 | New | A | A | New |
| 3B | C6 | L-NE | L-SE | L-NE | L-NE |
| 3C | C9 | T-SW | T-SW | T-SE | T-SW |
| 3D | C12 | L-NE | L-SE | T-SE | L-SE |
| 3E | C7 | L-NE | L-SE | L-NE | L-SE |
| 3F | C11 | T-SW | T-SW | T-SE | New |
| 3G | C14 | L-NE | L-SE | T-SE | T-SE |
| 3H | C13 | L-NE | L-SE | T-SE | L-SE |
| 3I | C5 | L-NE | L-SE | L-NE | L-SE |
| 3J | C10 | T-SW | T-SW | T-SE | T-SE |
| 3K | C15 | L-NE | L-SE | T-SE | New |
| 3L | C0 | L-NE | L-NE | L-NE | L-NE |

In addition, whether a node creates a new vector, closes an existing vector, or adds new coordinates to a vector also depends on its classification. Of the twelve cases described above that result from top-to-bottom, left-to-right combinations, there are only nine possible cases/classifications that include actions that modify the vectors (as opposed to extending them). Each of those nine cases includes two dots on the corresponding vector which is affected. For example, in FIG. 3A, the dots on NW and SE indicate that points are added to the vector that is associated with those positions. Similarly, the dots on NW and SW in FIG. 3B indicate that points are added to those vectors as well. By contrast, cases 5, 10 and 0 (corresponding to FIGS. 3I, 3J and 3L) do not have any dots and do not add any points to any vectors. That is, the vectors simply continue through those nodes.

How the point of the current node is added depends on where the point being added is relative to other points already in a vector, if any. A point can be added to the front or the back of a vector, and the system tracks the corner type for each point being added to a vector. The system also tracks which node is currently at the front and back of each vector. The vector actions are shown in Table 3 below:

TABLE 3

| Figure | Case | Vectors to Add to | Corner Codes |
|--------|------|-------------------|--------------|
| 3A | C3 | NW, SE | −1, 1 |
| 3B | C6 | NW, SW | −2, 2 |
| 3C | C9 | NW, NE | −3, 3 |
| 3D | C12 | NW, SW | 4, −4 |
| 3E | C7 | SW, SE | 2, 1 |
| 3F | C11 | NE, SE | 3, 1 |
| 3G | C14 | NW, SW | 4, 2 |
| 3H | C13 | NW, NE | 4, 3 |
| 3K | C15 | NW, SW, NE, SE | 4, 2, 3, 1 |

For newly created vectors, the point being added to the vector is added such that it acts as both the front point and the back point of the list of points for the vector, and the vector has set as its front corner and back corner values the corner code that was added with the point.

Figure 4A:
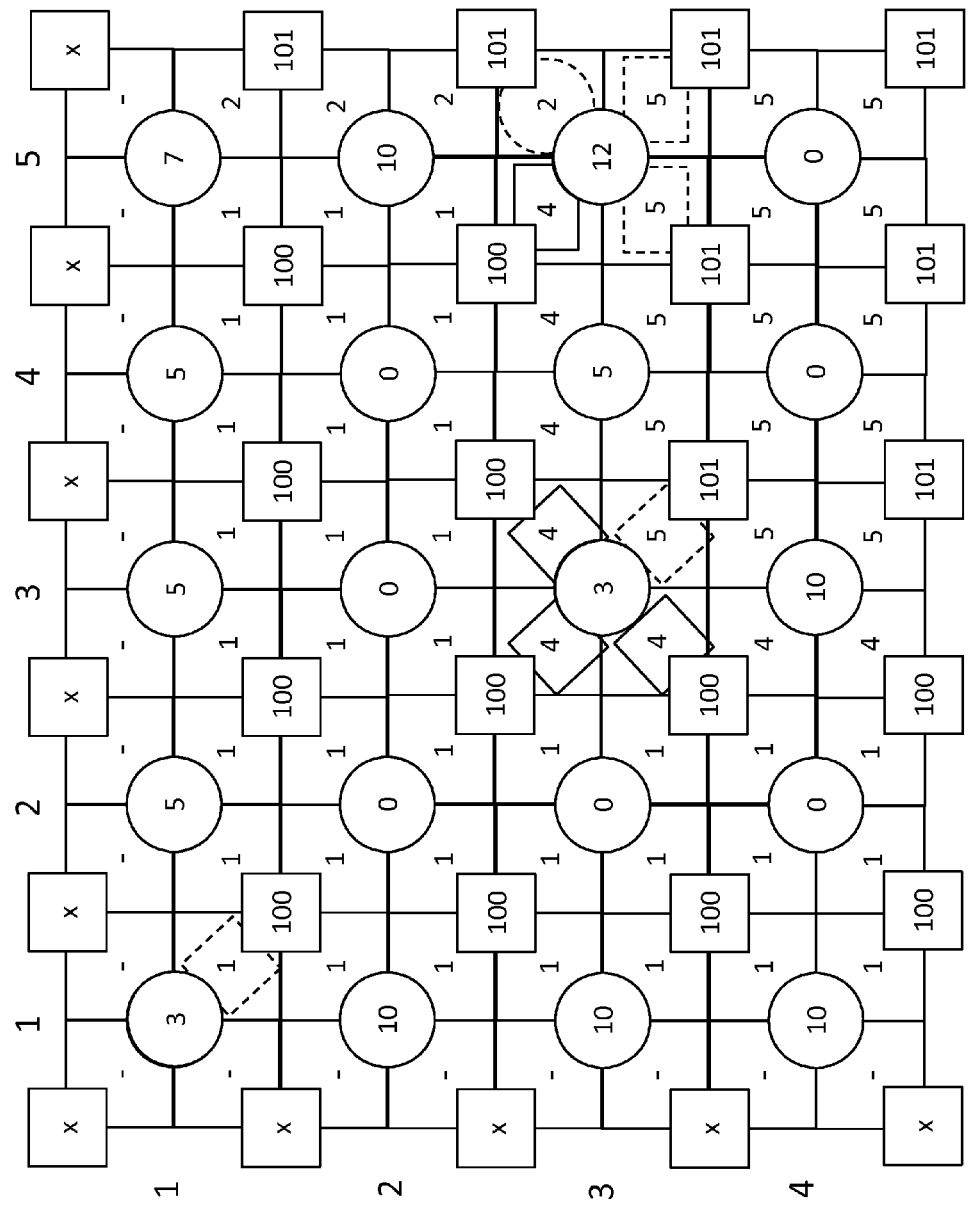
Figure 4B:
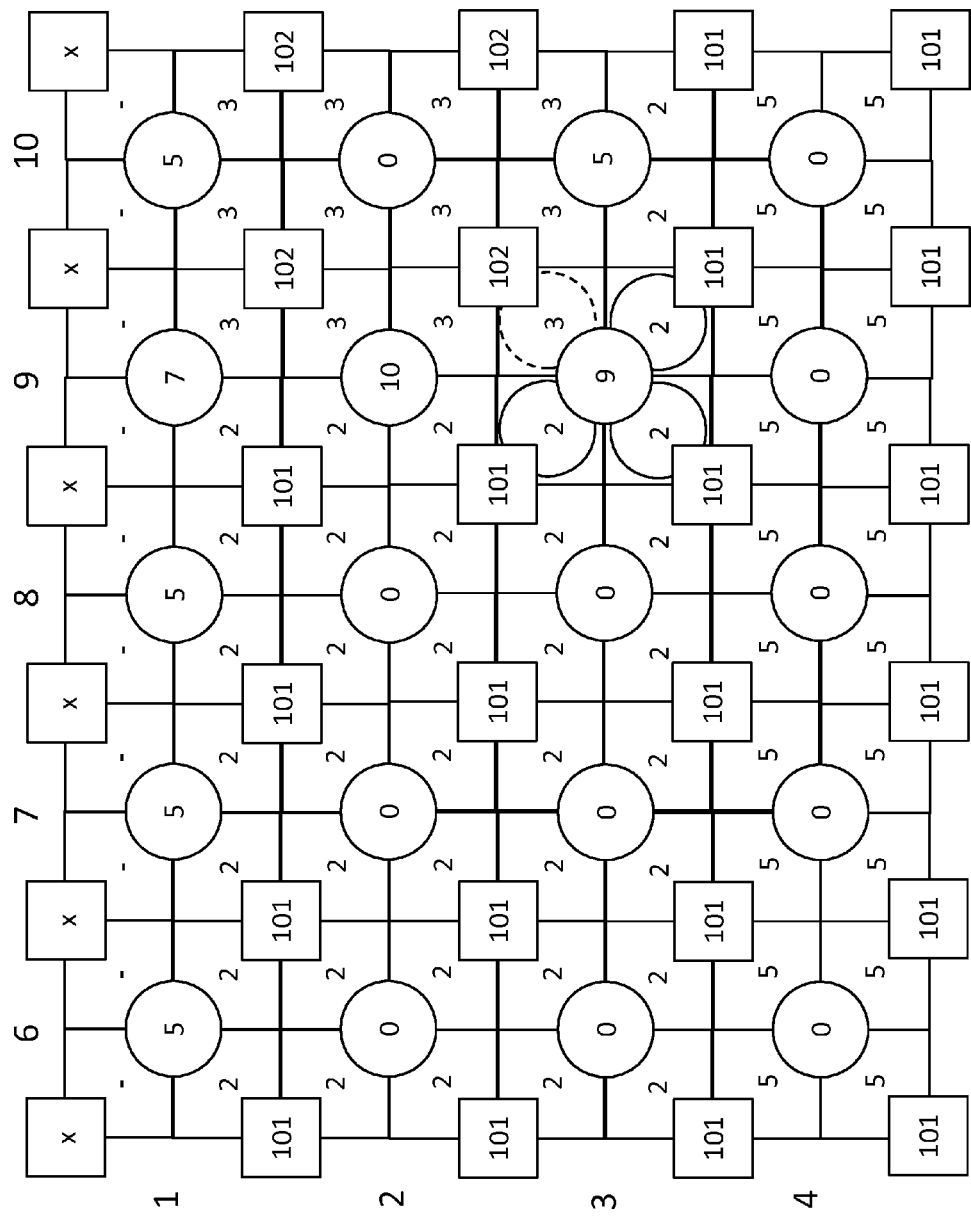
Figure 4C:
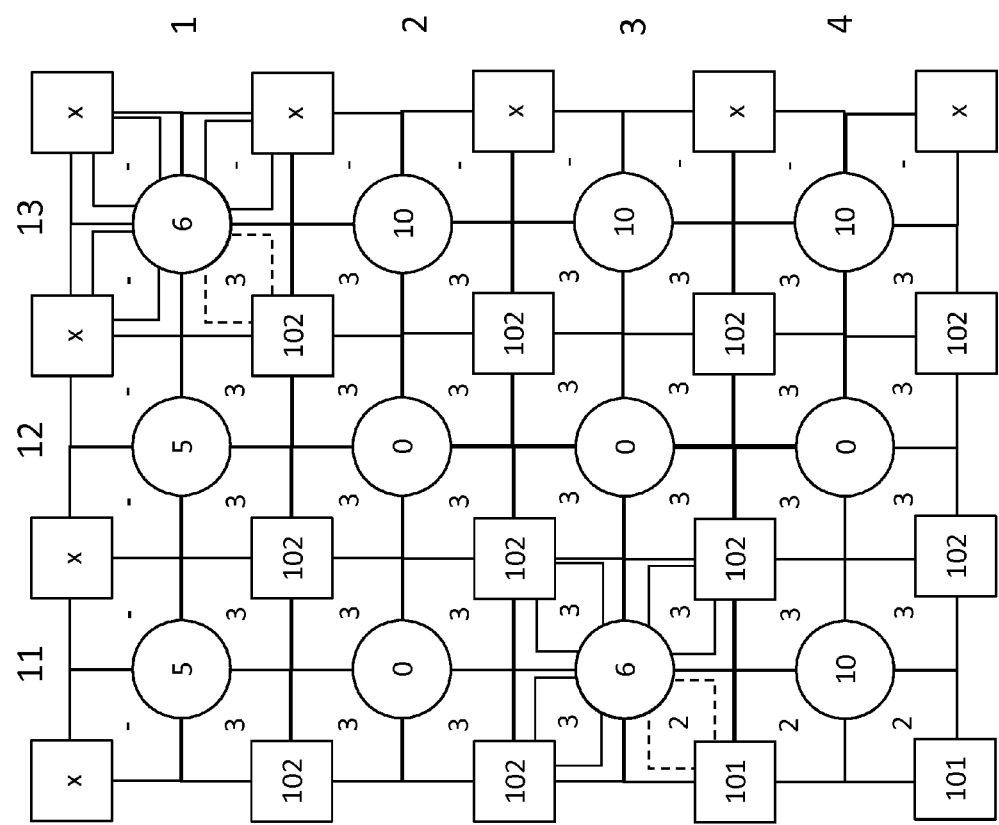
Figure 4D:
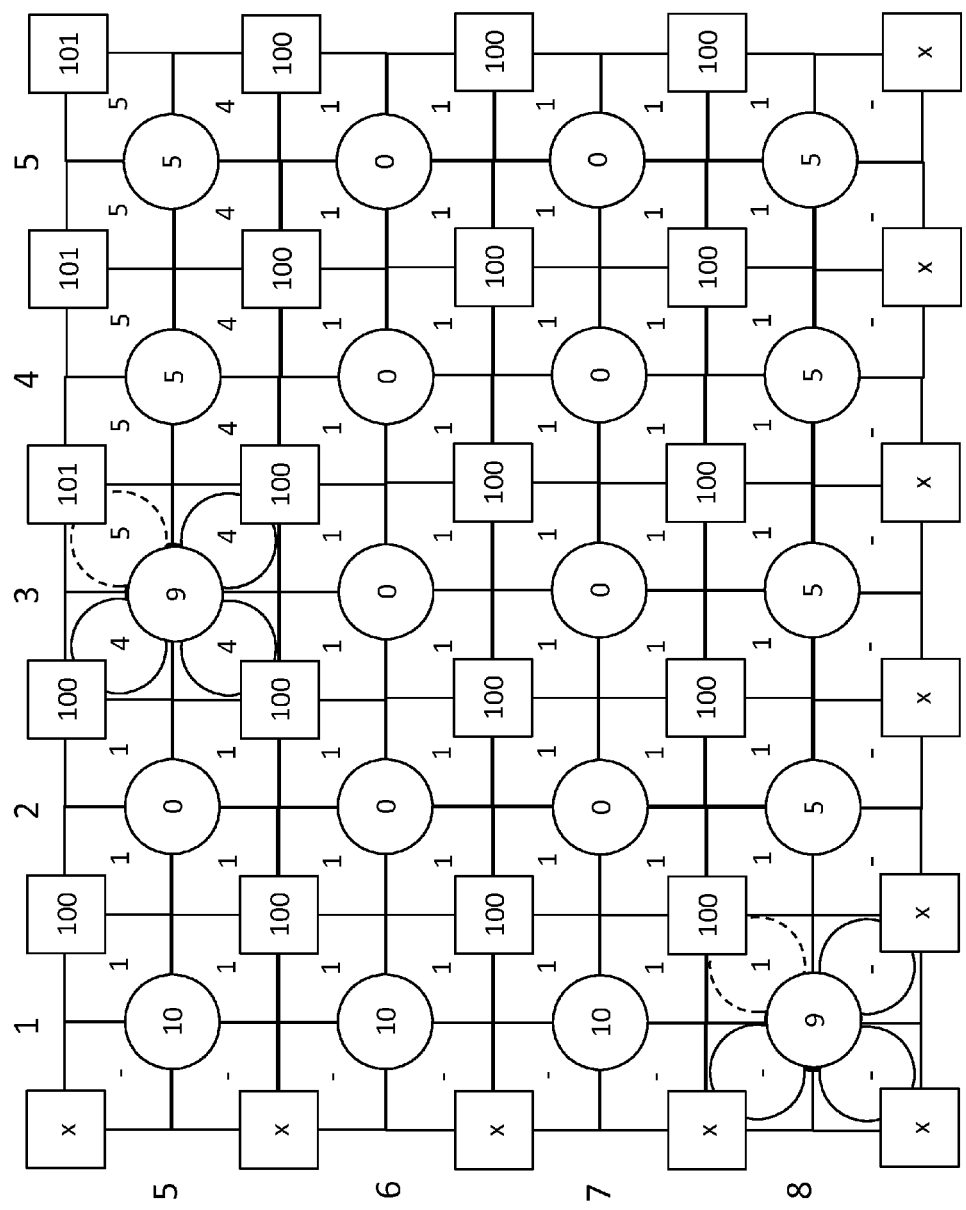
Figure 4F:
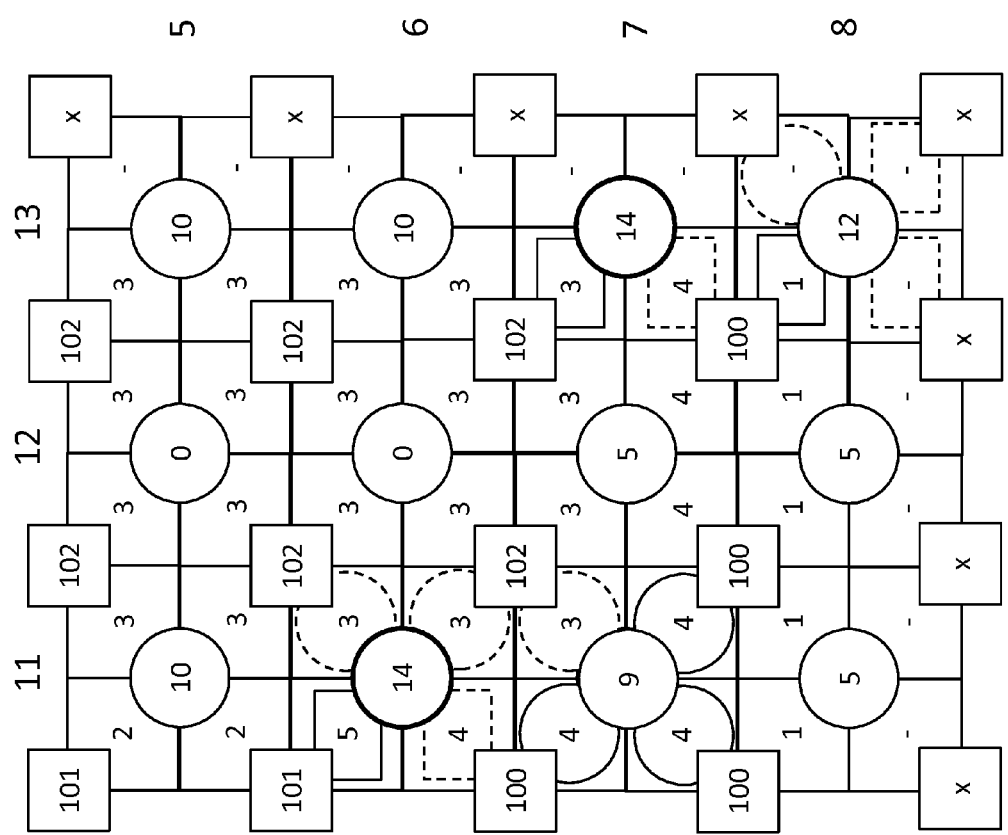

Turning to FIG. 4A, a portion of the image of FIG. 1A is shown, with the remainder of FIG. 1A being shown in FIGS. 4B-4F. The pixel values of the various lines are shown in the squares, the node classifications are shown in the circles, and the vectors are shown in the boxes under the circles for their corresponding nodes. For example, using the classifications of Table 1, the node at position (1,1) is classified as a "3" as it is an upper left-hand corner node. The node at position (2,1) is classified as a "5" as the two pixels above it are the same (i.e., an outer edge) and is two lower pixels are the same (i.e., have values of 100). Each of the other nodes in the first line are similarly processed such that the nodes of the first line are classified as, 3, 5, 5, 5, 7, 5, 5, 5, 7, 5, 5, 5, 6.

Each of those nodes is then processed according to the processing of Table 2. At node (1,1), a node classified as a "3" requires the creation of a vector for the NW and SE vectors of the node. However, as the NW vector would be "off the edge" of the image, no vector is created for it (as is shown by the "−"). However, the SE vector is assigned the first available vector number (e.g., "1") and copied into SE vector. According to the processing of Table 3, the point (1,1) is added as the only point so far in vector "1", and the front and back corner codes are set to 1.

At nodes (2,1), (3,1) and (4,1), the node classification of "5" requires that the NW and NE vectors be copied from their corresponding L-NE vectors. The SW and SE vectors are copied from their corresponding L-SE vectors.

At node (5,1), a node classified as a "7" requires that SW vector be copied from the corresponding L-SE vector, and a new vector is created for the SE vector. The new SE vector is assigned a new vector number (e.g., 2), and the point (5,1) is added to the "1" and "2" vectors. As with node (1,1) for a new vector, the (5,1) point is added as the only point so far in vector "2", and the front and back corner codes are set to 1. However, as vector "1" already has at least one point in it, the point (5,1) must be added to vector "1" according to the first matching rule of the rules of Table 4 as shown below.

TABLE 4

| Corner Code of Location of Vector being Added | Current Back Corner Code | Current Front Corner Code | Add to Back and Update Back Corner Code | Add to Front and Update Front Corner Code |
|---|---|---|---|---|
| 2 | 1 | | Y | N |
| 2 | −3 | | Y | N |
| 2 | | −3 | N | Y |
| −2 | | −1 | N | Y |
| −2 | | 3 | N | Y |
| −2 | 3 | | Y | N |
| 3 | −2 | | Y | N |
| 3 | | 1 | N | Y |
| 3 | | −2 | N | Y |
| −3 | | 2 | N | Y |
| −3 | −1 | | Y | N |
| −3 | 2 | | Y | N |
| 4 | | −1 | N | Y |
| 4 | | 3 | N | Y |
| 4 | −1 | | Y | N |
| 4 | 2 | | Y | N |
| −4 | 1 | | Y | N |
| −4 | −3 | | Y | N |
| −4 | | 1 | N | Y |
| −4 | | −2 | N | Y |

In addition, as shown in FIGS. 3D, 3G, 3H and 3K, directional arrows represent the linking of one set of vectors to another, possibly closing a loop of vectors at a corner.

Utilizing the above rules for adding points to vectors, the points (and their corresponding corner codes ("CC")) would be added to the vectors sequentially as shown below in Table 5:

TABLE 5

| Vector 1 | Vector 2 | Vector 3 | Vector 4 | Vector 5 |
|----------|----------|----------|----------|----------|
| (1,1) CC: 1 | (5,1) CC: 1 | (9,1) CC: 1 | (3,3) CC: −1 | (3,3) CC: 1 |
| (5,1) CC: 2 | (9,1) CC: 2 | (13,1) CC: 2 | (5,3) CC: 4 | (5,3) CC: −4 |
| (1,8) CC: 3 | (9,3) CC: −3 | (9,3) CC: 3 | (3,5) CC: −3 | (3,5) CC: 3 |
| (13,8) CC: 4 | (11,3) CC: 2 | (11,3) CC: −2 | (7,5) CC: 2 | (7,5) CC: −2 |
| | | (11,7) CC: 3 | (7,6) CC: −3 | (7,6) CC: 3 |
| | | (13,7) CC: 4 | (11,6) CC: 2 | (11,6) CC: 4 |
| | | | (11,7) CC: −3 | |
| | | | (13,7) CC: 2 | |

Utilizing the point addition rules of Table 4 on the sequentially added points and corner codes of Table 5 creates the following set of points for each of the vectors:

Vector 1: (13,8), (1,8), (1,1), and (5,1)
Vector 2: (5,1), (9,1), (9,3) and (11,3)
Vector 3: (13,7), (11,7), (11,3), (9,3), (9,1) and (13,1)
Vector 4: (5,3), (3,3), (3,5), (7,5), (7,6), (11,6), (11,7) and (13,7)
Vector 5: (11,6), (7,6), (7,5), (3,5), (3,3), (5,3).

As discussed above, an existing vector can be written to disk and removed from memory once it has been closed, keeping only active vectors in memory. For example, at point (13,7), vector 3 makes a loop on itself, and vector 3 can be written out (e.g., to a non-volatile long term storage, such as a hard disk, optical disk or Flash memory, or to a wired or wireless network). When a vector is written out, all relevant information about the vector (e.g., pixel value, points) is written out.

In addition, the system looks for loops between disconnected vectors that are for the same pixel value. At point (11,6), vector 2 is chained to vector 5 at the closing corner (case 14) as they both are for pixel value 101. This is possible as the front point (5,1) in vector 2 is an adjacent point to the back point (5,3) of vector 5. When the chaining results in the closing of a loop, that vector also can be written out to disk.

Figure 5:
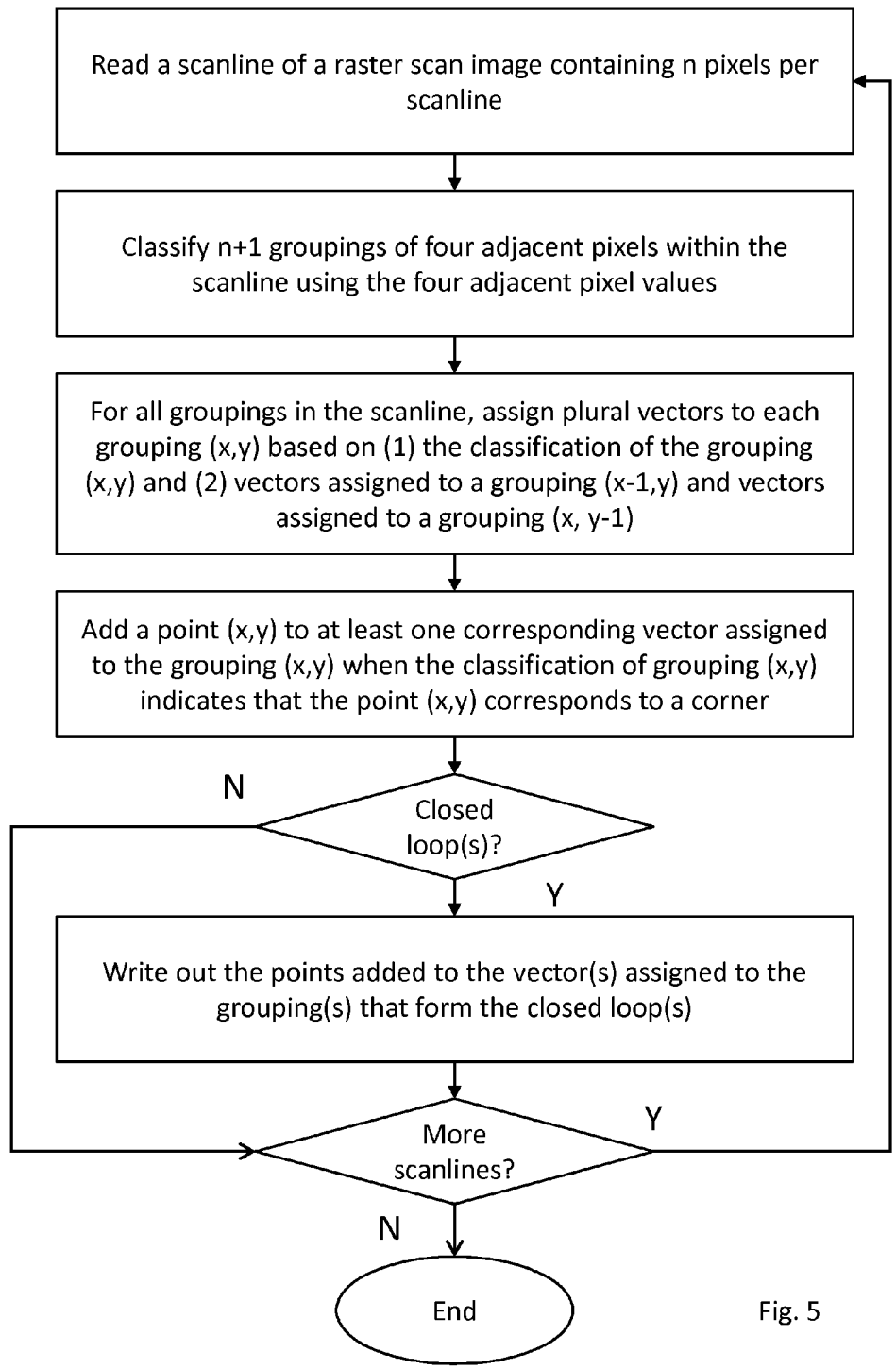
FIG. 5 is a flowchart showing the general scanline-by-scanline method of the present invention.

The above-described method is generally shown in FIG. 5 and is performed on a scanline-by-scanline basis (of n pixels per scanline) where the oldest scanline is removed from memory (or written over) as the next scanline is read in. Since the lower right pixel of a raster is necessarily classified as a case 12, the final remaining vectors in memory will be closed and written to disk, as occurred at node (13, 8).

The above-method can be performed using a general purpose computer including a computer processor and computer memory wherein the computer memory contains executable instructions for causing the computer processor to perform the steps described herein. In addition, special purpose hardware and/or embedded software (firmware) can be used to implement the method described herein while acting as a special purpose encoder.

While certain configurations of structures have been illustrated for the purposes of presenting the basic structures of the present invention, one of ordinary skill in the art will appreciate that other variations are possible which would still fall within the scope of the appended claims.

The invention claimed is:

1. A computer-implemented method of converting a raster scan image to a vector-based image using a computer processor and a non-transitory computer memory, wherein computer code stored in the computer memory causes the computer processor to perform the steps of:
   (a) reading a scanline of a raster scan image containing n pixels per scanline;
   (b) classifying n+1 groupings of four adjacent pixels within the scanline using only the four adjacent pixel values;
   (c) assigning to each grouping (x,y), for all groupings in the scanline, plural vectors based on (1) the classification of the grouping (x,y) and (2) vectors assigned to a grouping (x−1,y) and vectors assigned to a grouping (x, y−1);
   (d) adding a point (x,y) to at least one vector assigned to the grouping (x,y) when the classification of grouping (x,y) indicates that the point (x,y) corresponds to a corner;
   (e) determining whether the points added to any vector form a closed loop;
   (f) writing out the points added to any vector that forms a closed loop; and
   (g) repeating steps (a)-(f) for all of the scanlines of the raster scan image to form the vector-based image from the scanlines of the raster scan image.

2. The computer-implemented method as claimed in claim 1, wherein the step (e) of determining whether the points added to any vector form a closed loop comprises determining whether the points added to the any vector form a closed loop along with points added to a second vector having a same pixel value as the any vector,
   wherein writing out the points added to any vector that forms a closed loop comprises writing out the points added to the any vector that forms a closed loop along with the points added to the second vector if the points of the any vector and the second vector form a closed loop and have the same pixel value.

3. The computer-implemented method as claimed in claim 1, wherein the step (d) of adding a point (x,y) to at least one vector assigned to the grouping (x,y) when the classification of grouping (x,y) indicates that the point (x,y) corresponds to a corner comprises adding the point to the front of the at least one vector or the back of the at least one vector depending on the number of points added to the vector, a corner code of point being added and a corner code of at least one other point added to the vector if the at least one vector already includes at least one point.

4. The computer-implemented method as claimed in claim 1, wherein the step (f) of writing comprises writing out to non-volatile storage the points added to any vector that forms the closed loop and further comprises removing from memory the points added to any vector that forms the closed loop after writing out to the non-volatile storage the points added to any vector that forms the closed loop.

5. The computer-implemented method as claimed in claim 1, wherein the non-volatile storage comprises at least one of a hard disk, an optical disk and non-volatile semiconductor memory.

6. The computer-implemented method as claimed in claim 1, wherein the step (f) of writing comprises writing out to a network the points added to any vector that forms the closed loop and further comprises removing from memory the points added to any vector that forms the closed loop after writing out to the network the points added to any vector that forms the closed loop.

7. The computer-implemented method as claimed in claim 1, wherein the step (a) of reading comprises retaining in memory at most two scanlines of the raster scan image each containing n pixels per scanline.

8. A system for converting a raster scan image to a vector-based image, comprising:
   a computer processor; and
   computer memory including computer code stored in the computer memory configured to control the computer processor, the computer code comprising:
   (a) computer code configured to read a scanline of a raster scan image containing n pixels per scanline;
   (b) computer code configured to classify n+1 groupings of four adjacent pixels within the scanline using only the four adjacent pixel values;
   (c) computer code configured to assign to each grouping (x,y), for all groupings in the scanline, plural vectors based on (1) the classification of the grouping (x,y) and (2) vectors assigned to a grouping (x−1,y) and vectors assigned to a grouping (x, y−1);
   (d) computer code configured to add a point (x,y) to at least one vector assigned to the grouping (x,y) when the classification of grouping (x,y) indicates that the point (x,y) corresponds to a corner;
   (e) computer code configured to determine whether the points added to any vector form a closed loop; and
   (f) computer code configured to write out the points added to any vector that forms a closed loop.

9. The system as claimed in claim 8, wherein the computer code configured to determine whether the points added to any vector form a closed loop comprises computer code configured to determine whether the points added to the any vector form a closed loop along with points added to a second vector having a same pixel value as the any vector,
   wherein the computer code configured to write out the points added to any vector that forms a closed loop comprises computer code configured to write out the points added to the any vector that forms a closed loop along with the points added to the second vector if the points of the any vector and the second vector form a closed loop and have the same pixel value.

10. The system as claimed in claim 8, wherein the computer code configured to add a point (x,y) to at least one vector assigned to the grouping (x,y) when the classification of grouping (x,y) indicates that the point (x,y) corresponds to a corner comprises computer code configured to add the point to the front of the at least one vector or the back of the at least one vector depending on the number of points added to the vector, a corner code of point being added and a corner code of at least one other point added to the vector if the at least one vector already includes at least one point.

11. The system as claimed in claim 8, wherein the computer code configured to write out comprises computer code configured to write out to non-volatile storage the points added to any vector that forms the closed loop and further comprises computer code configured to remove from memory the points added to any vector that forms the closed loop after writing out to the non-volatile storage the points added to any vector that forms the closed loop.

12. The system as claimed in claim 8, wherein the non-volatile storage comprises at least one of a hard disk, an optical disk and non-volatile semiconductor memory.

13. The system as claimed in claim 8, wherein the computer code configured to write out comprises computer code configured to write out to a network the points added to any vector that forms the closed loop and further comprises computer code configured to remove from memory the points added to any vector that forms the closed loop after writing out to the network the points added to any vector that forms the closed loop.

14. The system as claimed in claim 8, wherein the computer code configured to read the scanline comprises computer code configured to retain in memory at most two scanlines of the raster scan image each containing n pixels per scanline.

\* \* \* \* \*